United States Patent [19]

Mayne

[11] 4,004,267
[45] Jan. 18, 1977

[54] DISCRETE FREQUENCY SEISMIC EXPLORATION USING NON UNIFORM FREQUENCY SPECTRA

[75] Inventor: William Harry Mayne, San Antonio, Tex.

[73] Assignee: Geosource Inc., Houston, Tex.

[22] Filed: May 8, 1975

[21] Appl. No.: 575,823

Related U.S. Application Data

[63] Continuation of Ser. No. 309,952, Nov. 28, 1972, abandoned.

[52] U.S. Cl. .................. 340/15.5 TA; 340/15.5 CP
[51] Int. Cl.² ........................................... G01V 1/14
[58] Field of Search ............ 340/15.5 TA, 15.5 CP, 340/15.5 GC

[56] References Cited

UNITED STATES PATENTS

| | | | |
|---|---|---|---|
| 3,182,743 | 5/1965 | McCollum | 340/15.5 TA |
| 3,259,878 | 7/1966 | Mifsud | 340/15.5 TA |
| 3,568,142 | 3/1971 | Landrum, Jr. et al. | 340/15.5 GC |
| 3,731,268 | 5/1973 | Landrum, Jr. | 340/15.5 TA |

*Primary Examiner*—Howard A. Birmiel
*Attorney, Agent, or Firm*—Arnold, White & Durkee

[57] ABSTRACT

A seismic exploration method is described in which a vibratory source transmits into the earth a series of discrete wave packets of different center frequencies, at least some of which are not uniformly spaced in frequency. Some of the center frequencies may, for example, be related to each other as a geometric progression. Each wave packet that is transmitted into the earth preferably has a modulation envelope according to a sinusoidal modulating wave that eliminates transient effects due to termination of the wave packet and minimizes the number of discrete wave packets required to define a given frequency band width. The received waves are recorded and later summed with a zero phase relationship relative to a common reference time. The composite record is similar to that obtained from an explosive source.

12 Claims, 8 Drawing Figures

DISCRETE FREQUENCY SEISMIC EXPLORATION USING NON UNIFORM FREQUENCY SPECTRA

CROSS REFERENCE TO RELATED APPLICATIONS

This is a continuation of application Ser. No. 309,952, filed Nov. 28, 1972 now abandoned.

BACKGROUND OF THE INVENTION

This invention relates generally to the art of geophysical exploration using artificially induced seismic waves. It is particularly concerned with a system for generating a series of seismic wave groups such that the addition of the frequency spectra of all of the seismic wave groups gives, in effect, essentially the frequency spectrum desired for a seismic exploration in a given area.

Geophysical prospecting using artificially induced seismic disturbances has found wide application in the search for petroleum and other products. In the reflection method, it is the general practice to initiate a seismic disturbance at a point on or near the surface of the earth. Part of the seismic waves generated travel downwardly in the earth until they encounter discontinuities in the earth's structure in the form of various substrata and layering. These discontinuities have the effect of reflecting a portion of the seismic waves back toward the surface of the earth. By arranging a number of vibrational pickups known as geophones at spaced distances from the point of initiation of the artificial seismic disturbance, it is possible to detect the arrival of the reflected seismic waves at the surface of the earth. These detected waves are translated into electrical signals which are indicative of the character of the ground motion and are usually referred to collectively as a reflection signal or seismogram which is in effect a composite signal made up of a plurality of electrical waves. Skilled interpreters analyze such seismograms and are able to determine the shape and depth of subsurface layering and the likelihood of finding accumulations of such minerals as oil and gas.

The artificially induced seismic disturbance has most frequently been produced by initiating a dynamite explosion in a shothole drilled in the surface of the earth. The firing of the dynamite explosives produces an impulsive wave of high energy content over a short duration. In recent times, mechanical vibrators have been employed to initiate the artificial seismic disturbance. These vibrators impart a low amount of energy over a long period of time such that the total energy input with time can be equal to that used with an explosive source of energy.

One of these seismic exploration systems using a mechanical vibrator is, for example, the Vibroseis system, of which U.S. Pat. No. 2,688,124 to Doty et al is typical. The Vibroseis system employs a unique signal usually consisting of a variable frequency vibration applied near the surface of the earth for a substantial period of time, for example 13 seconds. The system makes use of the fact that the waves received at the various geophone locations set up to receive the vibrations reflected from subsurface discontinuities are ultimately cross-correlated with a signal representing the vibrations transmitted into the ground to produce a correlated signal in which the various reflected waves appear as discrete wavelets. An essential requirement of the Vibroseis system is that the frequency of the vibration continuously varies and no two cycles of the transmitted wave should be of essentially the same frequency.

Another approach employing a mechanical vibrator is found in U.S. Pat. No. 3,182,743 to McCollum in which one after another, a series of wave trains of essentially sinusoidal wave form are transmitted into the ground. Each wave train is a discrete event of substantial by constant frequency, but the center frequency of each wave train in the series is different and are related by values of an arithmetic progression. The received waves due to each wave train are combined together in such a manner such that one of the central half cycles is in phase. The resultant waves after combination appear essentially like those obtained from the last step of the Vibroseis system, or like those of the systems employing a dynamite explosion.

U.S. Pat. No. 3,259,878 to Mifsud describes a method of seismic exploration quite similar to that described in the McCollum patent.

U.S. Pat. No. 3,221,297 to Smith et al also describes a method of seismic exploration in which discrete constant frequencies are transmitted into the earth and the ratio of the amplitude in phase of the transmitted waves and the received waves is recorded.

U.S. Pat. No. 3,568,142 to Landrum describes still another method very similar to the methods described in the Mifsud and McCollum patents except that provision is made for multiple filters and delay units so that the succession of wave trains transmitted in the earth can follow one upon the other without waiting for the vibration of one to be subsided before beginning the transmission of the next.

There are a number of advantages obtained by use of discrete wave groups of constant frequency in a series as taught by McCollum, Mifsud, and Smith et al. In these methods, each transmission of seismic waves is discrete and separate so that there is sufficient time for vibrational waves to subside and terminate the recording of waves due to one transmission before the beginning of the next transmission. Thus, there is no overlap on the resulting record of vibrations returning from deep subsurface layers due to a previous transmission of seismic waves at the same time that seismic waves are being returned from shallow subsurface layers due to a subsequent transmission. Another significant advantage is that since each wave group has primarily a single frequency, electrical wave filtering may be employed to pass only that frequency and suppress any frequencies due to extraneous noise. In addition, arrays of geophones and vibrators may be employed to act as filters for a particular frequency. One final and very significant advantage is that the method provides a simple and effective means of introducing greater energy at higher frequency and provide greater resolution for stratigraphic trap exploration. It is well known that the higher frequencies of seismic waves travelling through the earth are attenuated to a greater extent than are the lower frequencies. It is these higher frequencies that are required to provide the resolution for fine subsurface detail such as stratigraphic traps which are quite favorable to the accumulation of petroleum. For these higher frequencies multiple inputs of the same wave groups may be applied to the earth and summed in the output to create a higher energy level for resolution of the stratigraphic traps and other fine subsurface detail.

One of the problems associated with the technique of applying multiple wave groups of constant but different frequencies is that a large number of wave groups was thought to be required. In the use of a surveying system employing an explosive the duration of the explosive is just a fraction of a second and the recording time following detonation of the explosive is generally from four to seven seconds depending upon the depth in the earth that is of interest. Following each detonation of an explosive the survey may proceed to a new position. In a surveying system in which multiple wave groups of constant frequency are applied, it is usually most practical to apply each wave group sequentially and continue recording until all vibrations resulting from that input have subsided before beginning the application of the next wave group. The duration of each wave group may be only a fraction of a second but after each transmission there must be waited an elapsed time of four to seven seconds for recording of reflected waves from deep horizons. The more separate wave groups required to cover a given frequency spectrum the longer will be the time required to complete the survey for a given position. Thus, the number of wave groups required may be a critical factor in determining whether this method is feasible and economical. The longer equipment and personnel are required in the field the more expensive the survey. No matter how effective are the results, the economics of the situation may prohibit the practical application of the method.

SUMMARY OF THE INVENTION

The present invention is based upon the discovery that the center frequencies of each wave group need not necessarily be uniformly spaced in the desired frequency spectrum according to an arithmetic progression.

Briefly, in a presently preferred form of the invention, a system of seismic exploration is provided in which the desired effective down traveling wave is a composite signal and is obtained from a series of elementary wave packets, each elementary wave packet having a rather narrow band width. Each elementary wave packet is an elastic wave and can consist of a truncated sinusoid of finite length. The elementary wave packets are generated at a point near the earth's surface by a vibratory source and are reflected or refracted from subsurface strata. The center frequencies or carrier frequencies of the elementary wave packets are different and are spaced non-uniformly in frequency over the desired spectrum with half-amplitude points on adjacent spectra substantially in coincidence. The spacing between successive center frequencies of the series is preferably in the form of a geometric progression; i.e., the ratio of each term in the series to its predecessor remains constant. The spacing between center frequencies can also be in combinations of other types of progressions to meet desired conditions. For example, some of the frequency spectra can be spaced in a geometric progression and some in an arithmetic progression.

The return by reflection or refraction of each elementary wave packet from subsurface strata is detected and recorded independently. Thereafter, the recorded signals due to all the elementary wave packets are added together with the proper relative phase and amplitude to form an effective or composite signal or seismogram.

In order to obtain proper summation of the received waves due to each wave packet, the relative phase of the waves must be determined. In most cases it is most practical to record a counterpart signal of the elementary wave packets that are transmitted into the earth and use that to determine what relative phase and amplitude changes are necessary to obtain the desired, effective down-traveling waves. The relative phase and amplitude of the received signals due to each wave packet are then adjusted in the same relationship prior to summation.

In a presently preferred form of the invention, each of the wave packets containing multiple wave cycles of each center frequency has an envelope in the shape of half cycle of a sinusoid. The waves contained within each wave packet are of constant frequency, and can be considered carrier waves whereas the envelope of each wave packet can be considered the modulating wave. By applying the proper modulating envelope to each wave packet, undesirable repetitions of the effective down-traveling signal can be avoided together with the resulting ghosting effect.

The composite received signal produced in accordance with the invention can be operated upon or processed in any conventional manner. A synthesized reflection seismogram can be produced for multiple geophone stations in accordance with conventional practice where the vibratory source is located at a fixed position. These seismograms can be displayed in any conventional manner, such as in side-by-side relationship to form a seismic section which approximates a cross-sectional view of the earth through which the seismic waves are propagated.

BRIEF DESCRIPTION OF THE DRAWINGS

The accompanying drawings are briefly described as follows.

DESCRIPTION OF SPECIFIC EMBODIMENTS

Figure 1:
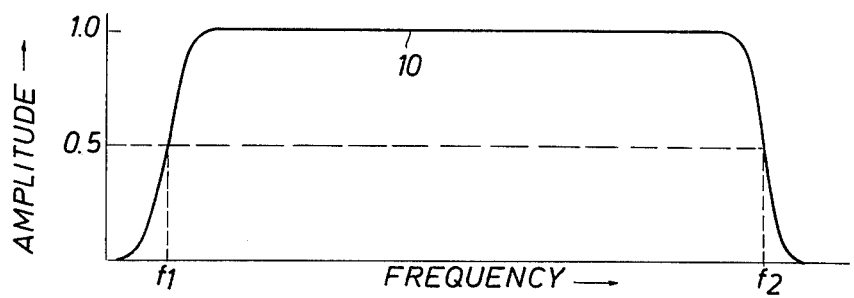
FIG. 1 represents a typical seismic wave frequency spectrum for an effective downgoing seismic wave.

It will be appreciated that the present invention can take many forms and embodiments, all of which would be impossible to describe or illustrate here. A limited number of forms of the invention and equipment embodying the invention will be described and illustrated for the purpose of giving an understanding of the invention. The true essence and spirit of the invention is defined in the appended claims, and it is not intended that the limited embodiments described in this specification and shown in the drawings should limit the invention.

In the practice of the invention, the total frequency band width for the effective down-traveling seismic wave is selected in order to obtain proper resolution for the subsurface strata under exploration. The resolution required is determined by a number of factors including the thickness of suspected layers of subsurface strata. In general, it can be said that the thinner the subsurface interval which is desired to be detected the higher the highest center frequency must be. Thick beds can be accentuated by using a low frequency for the lowest center frequency. A typical desired frequency spectrum for the effective down-traveling wave is illustrated in FIG. 1 in which $f_1$ is equal to approximately 20 Hertz and $f_2$ is equal to 80 Hertz. This frequency range, of course, varies with different areas of the earth and different depths of interest to subsurface layering. In some cases it may be desirable to have a general shape for the frequency spectrum other than is shown as being substantially flat.

Figure 2:
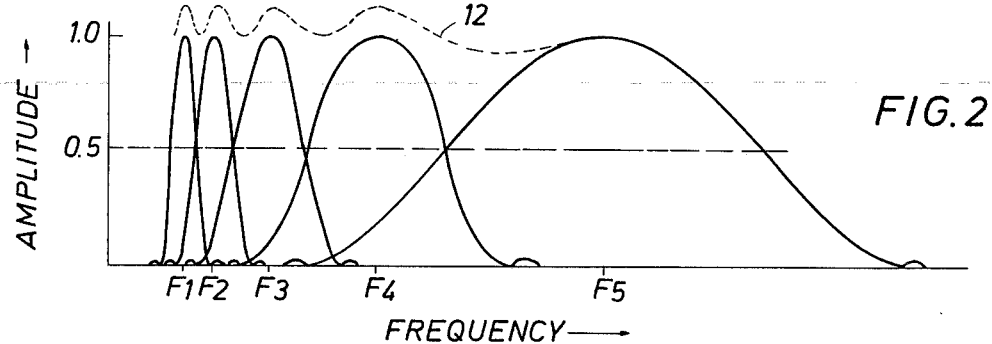
FIG. 2 represents the frequency spectrum of FIG. 1 which can be defined according to a number of elementary frequency spectra corresponding with wave packets produced in accordance with the invention.

In order to obtain a frequency spectrum as shown in FIG. 1, the elementary wave packets transmitted in accordance with the invention have frequency spectra which collectively define the spectrum shown in FIG. 1. For example, FIG. 2 illustrates a group of elementary frequency spectra which when added together has a composite spectrum shown by dashed line 12 which approximately defines the desired frequency spectrum shown by the line 10 in FIG. 1. The small amount of ripple shown in the composite spectrum by line 10 is negligible in most cases with the proper spacing and number of elementary frequency spectra.

The elementary spectra shown in solid line in FIG. 2 have center frequencies $F_1$, $F_2$, $F_3$, $F_4$, and $F_5$, that fall into a geometric series. That is, the ratio between each term in the series to its predecessor remains constant. Thus, $$F_2/F_1 = F_3/F_2 = F_4/F_3 = F_5/F_4 \qquad (1)$$

For the elementary spectra shown in FIG. 2 the increment between adjacent center frequencies increases with increasing frequency according to a geometric progression. It may be desirable to have elementary spectra that are spaced apart with decreasing increments between adjacent center frequencies with increasing frequency.

It has been found experimentally that when a series of equal amplitude wave packets are used with the geometric progression relationship that the composite spectrum has a negative tilt of six db. per octave. This results from the lower amount of energy content in each wave packet at the higher end of the spectrum. If this tilt in the composite spectrum is found undersirable in a particular case, it can be corrected in a number of ways. Preferably, additional transmissions of the wave packets at the higher frequencies can be made to yield higher energy content in the summation. Also, the received signals due to each wave packet could be weighted in amplitude during processing to produce a truly flat composite frequency. If some composite spectrum other than flat is desired, other appropriate weighting schedules can be applied.

Third, the design of the elementary frequency spectra can be such that the bandwidth and increment at the lower end of the composite spectrum is large and decreases with increasing frequency. This is just the opposite of the effect shown in FIG. 2 where the bandwidth and increments between center frequencies of the spectra are small at the lower end of the spectrum and increase with increasing frequency. For example, the center frequencies could be 15, 45, 65, 75, and 80 Hz.

No matter what the relationship of center frequencies, the elementary frequency spectra are preferably designed so that adjacent spectra are coincident at half amplitude points as shown in FIG. 2. Small departures can be made from half-amplitude coincidence, but any large departures from this condition can result in serious ripples in the composite spectrum.

Figure 3:
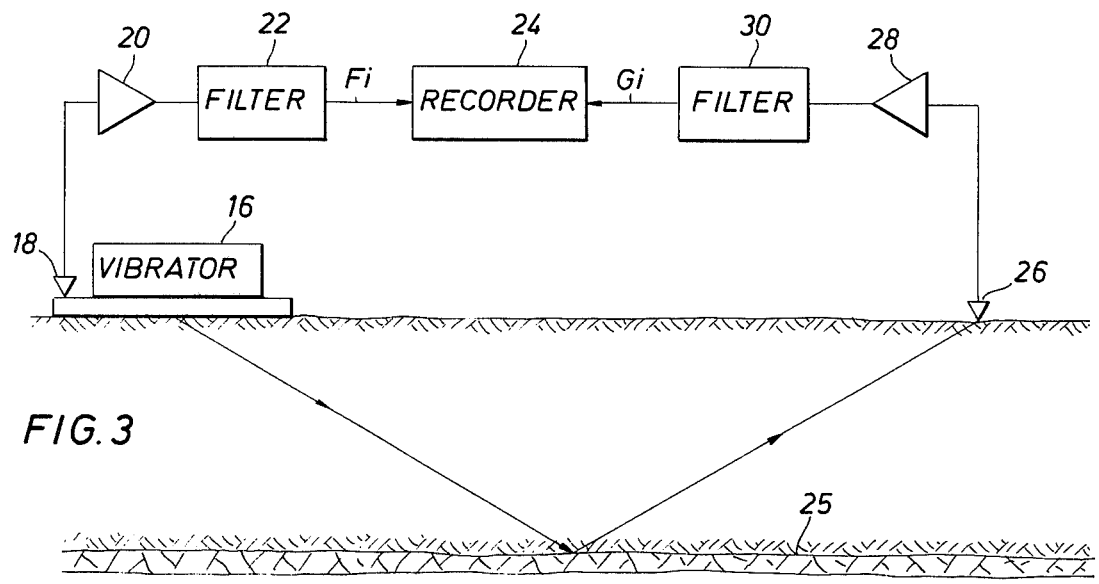
FIG. 3 is a schematic diagram of a field system for transmitting, receiving and recording the signals illustrated in FIG. 5.
Figure 4:
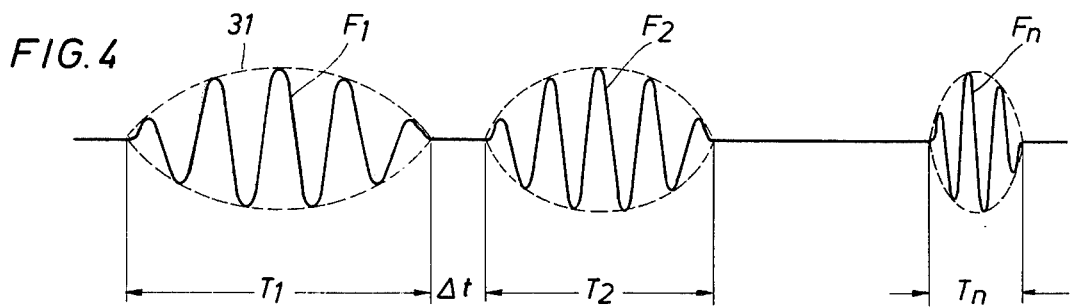
FIG. 4 illustrates a typical set of wave forms of the wave packets transmitted into the earth in accordance with the present invention.
Figure 5:
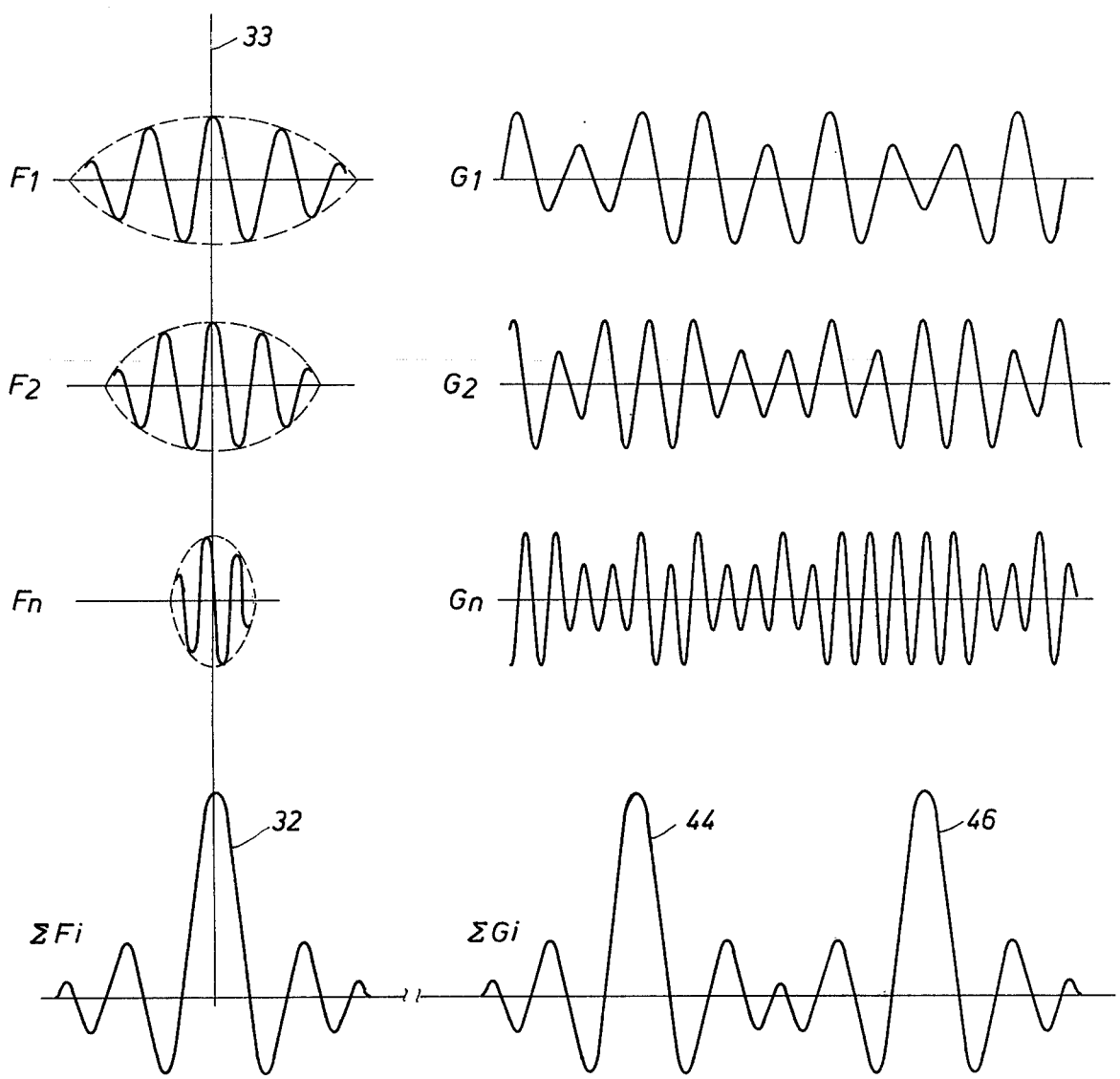
FIG. 5 illustrates a typical set of elementary wave packets transmitted in accordance with the invention and a set of received signals due to each wave packet, together with the summation of the elementary wave packets to achieve an effective down-traveling seismic wave and the summation of the received signals to provide a composite signal.

FIG. 3 illustrates means for transmitting the elementary wave packets with frequencies $F_1$ to $F_n$ and for detecting and recording the received waves $G_1$ to $G_n$, as shown in FIGS. 4 and 5. A vibrator 16 is shown which is of the character to transmit into the earth an elementary wave packet having a narrow band frequency spectrum with a center frequency of, for example, $F_1$ in FIG. 2. The vibrator should be capable of generating and transmitting into the earth transient bursts of energy or wave packets of different durations and having frequency spectra corresponding to each one of the elementary spectra as described above and, for example, spectra with center frequencies $F_1$, $F_2$, $F_3$, $F_4$, $F_5$, as shown in FIG. 2, where such center frequencies form substantially a geometric progression. Such a vibrator may be obtained from the Westinghouse Air Brake Company, George E. Failing Division, Enid, Oklahoma.

Located on the radiating plate or base of vibrator 16 is a geophone or other seismic pickup 18 to detect the wave packet which is transmitted into the earth as illustrated in FIG. 4. For example, for the first wave packet with center frequency $F_1$, as shown in FIG. 4, the output of the pickup 18 is passed through an amplifier 20, filter 22 to a recorder 24. Filter 22 is a narrow band filter used primarily to eliminate the extraneous noise and is normally set to pass a bandwidth approximately equal to the band width of the wave packet the vibrator is currently transmitting into the earth. Located remotely from the vibrator 16 is a geophone station 26 which is a seismometer or vibrational detector designed to detect ground motion and convert it into related electrical waves. The geophone station 26 may comprise a single detector or a number of detectors arranged in an array to improve the reception of the desired waves to be received such as from a subsurface reflecting interface 25. The output of the geophone station 26 is passed to an amplifier 28 and through a filter 30 which is preferably identical to filter 22. The output of filter 30 is recorded in the recorder 24 in a form $G_1$ as represented in FIG. 4. Recorder 24 may be any convenient recording means in which the signal recorded is readily reproducible. A most common means for such a recorder 24 is magnetic tape using a number of recording heads and recording channels. In such case there is a separate recording channel on magnetic tape for each of the signals $F_i$ and $G_i$ corresponding to each separate wave transmission. Suitable multiple channel magnetic recorders and the methods of operating them are well known in the art.

Each of the wave packets transmitted into the earth by the vibrator 16 is preferably of an amplitude modulated form as shown in FIG. 4. For example, the wave packet with a center frequency $F_1$ is provided with a modulating envelope which is shown in dashed line at 31. The envelope for each wave packet can be considered a modulating wave and the waves within each wave packet can be considered to be a carrier wave or modulated wave. As shown in FIG. 4, the first wave packet with a center frequency $F_1$ may have a period or duration of $T_1$. The envelope for each wave packet is preferably sinusoidal. The duration of each wave packet as shown in FIG. 4 with periods $T_1$, $T_2$, and $T_n$ are preferably different and form a sequence that is also in a geometric series of the same type as the center frequencies of the transmitted waves. Stated differently, it is preferred that the ratio of the frequency of the modulating waves to the center frequency of each wave packet remain constant. This ratio is referred to herein as the modulation index. It can also be defined as the product of the center frequency and the duration (period) of a wave packet. The duration of each of these wave packets will depend upon the frequency bandwidth chosen. The time lapse between the end of one wave packet and the beginning of the next is presently preferred to be long enough to complete recording of reflections of the deepest zone of interest (for example, five or six seconds) and to permit all reverberations and vibrations in the earth to have subsided to an acceptable level. Thus, as shown in FIG. 4, the time $\Delta t$ may be on the order of five to seven seconds. For a bandwidth in the normal seismic range of 20 to 80 Hertz, the duration of each wave packet T as shown in FIG. 4, will normally be a fraction of a second.

If each wave packet as shown in FIG. 4 is amplitude modulated with an appropriate modulating wave, a lesser number of wave packets can be used in surveying to define the given frequency bandwidth which is desired. In the absence of such amplitude modulation, many more separate wave packets would be required. In accordance with the invention, only seven separate wave packets would be required to cover a bandwidth from 20 to 80 Hertz, for example.

The criteria for determining the number of wave packets required to cover a given bandwidth and their center frequencies and duration can be defined by the following equations where:

The number of terms (wave packets) in a series is 1 through $n$ and the subscript $i$ is used to designate a particular term in the series;

F is the center frequency of a wave packet;
M is the modulating frequency of each wave packet;
W is the ratio of the highest to the lowest center frequency in the series (i.e., $F_n/F_1$) and C is the ratio of the modulating frequency (M) to the center frequency (F) of a given wave packet, or the modulation index (also equal to the product of the center frequency and the duration of each wave packet).

Thus, $$R = F_n/F_1 \tag{2}$$

$$M_1/F_1 = M_n/F_n = \ldots M_i/F_i = C \tag{3}$$

Furthermore, in order to cover the required bandwidth uniformly, the frequencies of successive terms are related as follows:

$$F_n + M_n = F_{n+1} - M_{n+1} \tag{4}$$

The ratio between successive terms for a given bandwidth is given by $$F_{n+1}/F_n = (W)^{1/(n-1)} \tag{5}$$

As a specific example for the equations stated above, let the ratio W equal 4, the modulation index C equal 0.115, the lowest center frequency of a wave packet in the series $F_1$ equal 15 Hz. and the geometric ratio $F_{n+1}/F_n = 1.26$.

Applying these values to the equations above, the number of wave packets or terms in the series becomes 7.

The required center frequencies and modulating frequencies for each of the seven wave packets in the series are given by the following table:

| Term | 1 | 2 | 3 | 4 | 5 | 6 | 7 |
| --- | --- | --- | --- | --- | --- | --- | --- |
| Center Freq. (Hz.) | 15.0 | 18.90 | 23.80 | 30.00 | 37.80 | 47.60 | 60.00 |
| Modulating Freq. (Hz.) | 1.72 | 2.18 | 2.74 | 3.45 | 4.35 | 5.50 | 6.90 |

By contrast with the geometric progression of center frequencies described above, a uniform spacing of the center frequencies across the desired frequency spectrum in an arithmetic series would require a constant modulation frequency of no more than 2 Hz. with 12 terms spaced at 4 Hz. intervals to cover a bandwidth from 15 to only 59 Hz. In this case, the modulation index at 15 Hz. would be 0.133 as compared to 0.115 for the geometric series. At low frequencies such as 15 Hz. it is quite difficult to amplitude modulate a carrier signal in a brief period of time such as a fraction of a second. Therefore, it is quite an important advantage according to the invention to be able to employ a constant modulation index for all the wave packets of the series and employ a lower modulating frequency for the lower frequencies than would be possible with a group of evenly spaced center frequencies.

Of course, the efficiency and practical economy in using only seven wave packets for the geometric series described above is obvious compared with twelve wave packets that would be required if the center frequencies were evenly spaced.

In certain situations it may be desirable to use elementary frequency spectra in accordance with the invention with center frequencies that form more than one type of progression. For example, the center frequencies at the lower end of the composite spectrum may form a geometric progression while the center frequencies at the upper end of the spectrum form an arithmetic series. To give a specific example, center frequencies may be: 10, 15, 22.5 (geometric), 30, 40, 50, 60 (arithmetic) Hz.

The use of a geometric progression at the lower end of the spectrum could be particularly desirable in order to maintain a constant modulation index at the lower end. It is quite difficult for most mechanical vibrators to produce a low frequency wave with a high modulation index which would be required with the use of an arithmetic progression throughout the composite spectrum.

In operation, the apparatus in FIG. 3 is adjusted so that vibrator 16 successively transmits into the earth wave packets $F_1$ through $F_n$ as illustrated in FIG. 4 which are sufficient to approximate the desired frequency spectrum illustrated in FIGS. 1 and 2. When the transmitted wave packet signals $F_1$ through $F_n$ are added, after proper adjustment in relative phase, there will be produced a summation signal denoted $\Sigma F_i$ such as illustrated in FIG. 5. The amplitude and relative phase of the transmitted wave packet signals $F_1$ through $F_n$ are adjusted to a common reference time denoted by the line 33 to give a sharp peak or spike 32 as may be desired.

Figure 6:
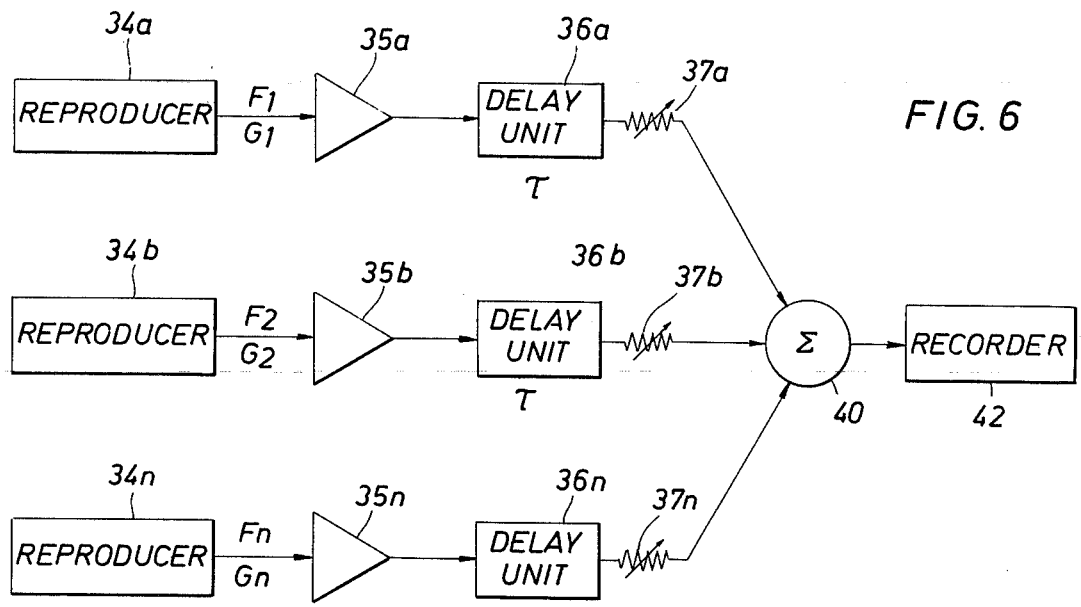
FIG. 6 is a simplified diagram of means for adding signals corresponding with the transmitted wave packets and the received waves due to each transmitted wave packet.

Referring now to FIG. 6, there is illustrated a means for adding the output signals $F_i$ in a manner to obtain a desired peak 32 (FIG. 5) of the composite signal. Illustrated in FIG. 5 are reproducers 34a through 34n for reproducing the information stored and recorded in recorder 24 of FIG. 3, for example. The outputs of reproducers 34a–34n are connected respectively to amplifiers 35a through 38n respectively. The outputs of amplifiers 35a–35n are connected respectively to delay units 36a through 36n which are of a character to delay the signal for a variable time ranging from zero delay to any desired delay which may be as much as a half-second or more. The output of amplifiers 36a through 36n are connected respectively to gain control units 37a through 37n which are of a character to provide an amplitude weighting to the signals for the purpose of compensating for differences in energy content. The outputs of gain control units 37a through 37n are fed to a summation network 40 and the output of summation network 40 is in turn electrically connected to a recorder 42 or to some unshown display means.

The apparatus shown in FIG. 6 is used to add the signals corresponding with the transmitted wave packets $F_1$ to $F_n$ should it be desired for analysis or for determination of relative phase in producing the composite signal. Each transmitted wave packet $F_1$ to $F_n$ may be reproduced by reproducers 34a through 34n respectively. These reproducers are preferably of the type employing magnetic tape. The signals corresponding with wave packets $F_1$ through $F_n$ are reproduced simultaneoulsy and added through summation network 40 and stored on recorder 42 or displayed in a display means unshown. Such display means may take the form of an oscilloscope so that the effects of changing the delay or the amplitude of any signal can be readily and quickly observed. If necessary, the delay of the various signals may be adjusted by delay units 36a through 36n and the amplitude can be varied by the respective gain control units 37a through 37n. The delays and amplitudes are varied for each signal, if necessary, to obtain a summation signal which has a sharp peak and minimum side lobes such as 32 shown in FIG. 5.

After the apparatus shown in FIG. 6 has been used to obtain a summation signal where a desired zero phase summation has been obtained, the same relative phase and amplitude is required for summation of the received signals $G_1$ through $G_n$. Thus, the same or similar apparatus shown in FIG. 5 can be used to produce a summation or synthesized effective received signal denoted $\Sigma G_i$ shown in FIG. 4 having reflection events 44 and 46. The same delay setting and amplifier setting, if any, required for transmitted signals $F_1$ to $F_n$ to produce the desired summation transmitted waveform are used for received signals $G_1$ through $G_n$ respectively. It should also be appreciated that the frequency filtering shown in FIG. 3 could equally well be included in each reproduced channel of FIG. 6.

In a presently preferred form of the invention, each of the transmitted wave packets as shown in FIG. 4 of the drawings are transmitted sequentially with sufficient intervening time between the termination of one wave packet and the beginning of the next to allow all reverberations and vibrations to have died out to a sufficient level and a record to have been completed of all of the received waves. This preferred form of the invention has the advantages that have been described above.

It may be desirable in certain instances to speed up the gathering of field data in accordance with the invention and there are a number of ways to accomplish this. For example, a single vibrator may be used as the source of transmitting energy, but the duration between wave packets may be shortened or eliminated. In this case the recording and receiving equipment must include a plurality of tuned filters, one filter for the center frequency of each wave packet. Such a method is described in U.S. Pat. No. 3,568,142 to Landrum. By this technique waves are being received at the geophones from shallow horizons due to one transmitted wave packet at the same time that waves of a different frequency are being received from deeper subsurface horizons due to a predecessor transmitted wave packet. Thus there is overlap among the reflected waves due to the different frequencies of transmitted waveforms that are separated by the series of tuned filters. The outputs of the geophones can be recorded directly for later processing with appropriate multichannel filtering in summation. Alternatively, such filters may be included in the field directly connected to the outputs of the geophones and summation may be achieved in the field with the appropriate delay means incorporated in each filter channel. The time lapse for recording in each position by this technique might be on the order of 8 to 10 seconds for 5 to 10 transmissions of wave packets.

Another way to speed up the gathering of data in the field in accordance with the invention is to use a plurality of vibrators, each transmitting at a different center frequency. In such a case, filtering would be employed as described above in connection with the use of a single vibrator. The use of multiple vibrators has the advantage of eliminating the amount of time required for transmission of each individual waveform. Thus, the gathering of each record by this method might require approximately six seconds total per position.

As mentioned above, the geophones as well as the vibrator sources may be arranged in arrays to achieve wave filtering. The geophone arrays may be tuned to each particular frequency by well-known means of switching among the connections of a group of geophones that are dispersed on the ground. Filtering by an array of vibrators may be accomplished by the use of a single vibrator that is moved from one location to another and the same series of wave packets transmitted at each location. All the transmitted signals are thus added and all the received signals are added. The added signals can then be processed by any of the systems described above. This will improve the directionality of the source, eliminate part of the surface wave transmitted and improve the signal-to-noise ratio of the overall detection system. Rather than use only one vibrator many vibrators may be employed at different locations simultaneously to speed up the process.

As mentioned above, one of the advantages of the invention is that it provides a simple and economical means to enhance the amount of energy transmitted at higher frequencies for such high resolution requirements as stratigraphic trap investigation. Thus there may be selective reinforcement of the received wave due to the higher frequency wave packets without the necessity to repeat the transmissions of waves at the lower end of the spectrum. To give a specific example, consider a set of wave packets with center frequencies of 15, 18.9, 23.8, 30, 37.8, 47 and 60 Hz. A first series of recordings would be obtained with all of the sequence of wave packets. A next recording might be obtained with a transmission of wave packets at 30.0, 37.80, 47.6 and 60 Hz.; then, 37.8, 47.6 and 60 Hz.; then, 47.60 and 60 Hz.; and finally, only 60 Hz. Field test would be required in each area to design the number of replications of the same wave packets that are required to build up sufficient energy and amplitude in the received signal to resolve strata that may be of interest in the subsurface below, and overcome the effect of ambient noise at all frequencies and recording times of interest.

It is preferably preferred that the received signals be summed with proper phase without regard to any cross-correlation techniques with the counterpart of the transmitted waves. In certain instances, however, it may be desirable to use cross-correlation techniques with the input signal. For example, in an alternate method of processing the counterpart signals of the wave packets $F_1$ illustrated in FIG. 5 are added together so that they approximately overlap in time. Approximate overlap is all that is required since, in this system, there is no critical adjustment of relative phase of the $F_i$ signal. The received signals $G_i$ are also added with the same relative phase as their corresponding $F_i$ transmitted signals. These summations can be obtained on the equipment shown in FIG. 6 of the drawings as previously described. Then the sum of the transmitted signals $\Sigma F_i$ is cross-correlated with the sum of the received signals $\Sigma G_i$.

Hence the cross-correlation $$\phi(\tau) = (1/2T) \int_{-T}^{T} [L(t-\tau)][k(t)]dt \qquad (6)$$

where
$h(t) = \Sigma F_i(t)$,
$k(t) = \Sigma G_i(t)$,
$\tau$ is the delay between $h(t)$ and $k(t)$,
and 2T is the duration of $h(t)$.

The above described correlation scheme will essentially accomplish the same purpose as the summation method described previously (See FIG. 5) and yet the adjustment of the transmitted signals $F_i$ and the received signals $G_i$ before summation need not be critical.

Figure 7:
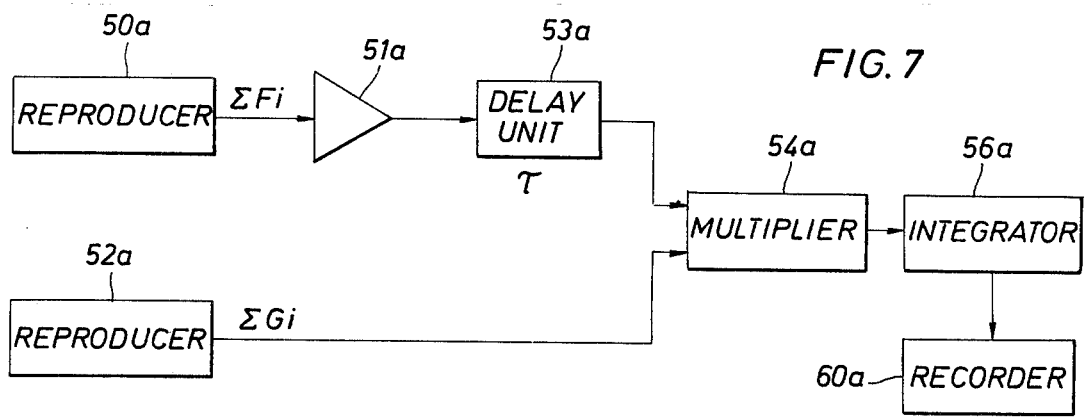
FIG. 7 illustrates another means for processing the signals corresponding with transmitted wave packets and received waves to obtain a composite signal.
Figure 8:
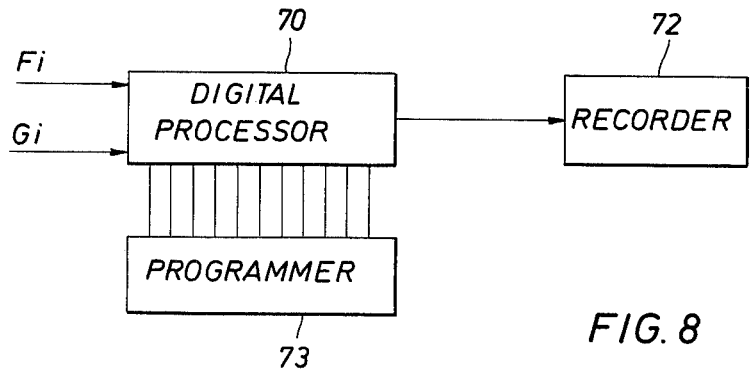
FIG. 8 illustrates a block diagram of still another means for processing signals corresponding with transmitted wave packets and received waves to obtain a composite signal.

Apparatus for correlating the summation of the transmitted signals $\Sigma G_i$ are shown in FIGS. 7 and 8 of the drawings. In FIG. 7 there is illustrated a reproducer 50a for playing back a recording of $\Sigma F_i$. Also illustrated is a reproducer 52a which is capable of reproducing the summation of the received signals $\Sigma G_i$ such as stored in recorder 42 of FIG. 3. Both the units 50a and 52a may be magnetic tape playback equipment. The output of reproducer 50a is connected to an amplifier 51a which in turn is connected to a delay unit 53a. The output of delay unit 53a is multiplied by the output of reproducer 52a in the multiplier 54a. The product of multiplier 54a is fed to integrater 56a and recorded by a recorder 60a. The recorder 60a normally has a reproducible recording means such as magnetic tape so that the integrated signal can be reproduced. Additional similar equipment can be used so that the above operations are performed simultaneously for a large number of geophone stations or for various locations of the vibrator.

The summation signals $\Sigma F_i$ and $\Sigma G_i$ are multiplied for zero delay, as the initial value of $\tau$, and this product is integrated or summed to get the initial value of the final reflection seismogram. The delay $\tau$ has been increased in incremental steps and the multiplication and integration is repeated at each step. Thus the final reflection signal or seismogram will comprise a series of values of $\phi(\tau)$ for increasing values of delay $\tau$. In FIG. 7 the signal for $\Sigma F_i$ and $\Sigma G_i$ will be played back once for every choice of delay $\tau$ to produce signals similar to those obtained without correlation as shown in FIG. 5.

Another way of processing signals in accordance with the invention is illustrated in FIG. 8. A digital processor 70 may be used whose output is connected to a recorder 72 which may be a plotter or a magnetic tape recorder. The transmitted signals $F_i$ and the received signals $G_i$ are fed to the digital processor 70 for processing in accordance with the principles described above. The digital processor 70 may be programmed by a programmer 73 to execute the steps described above, by techniques that are well known in the art.

What is claimed to have been invented or discovered is:

1. A method of seismic exploration to obtain a composite seismic signal having a preselected frequency spectrum which comprises:
    a. transmitting a set of discrete seismic wave packets of narrow bandwidth into the earth, each of such wave packets being of different bandwidth, and having different center frequencies, wherein most of the center frequencies of the wave packets are substantially related to each other according to the values of a geometric progression within the preselected frequency spectrum and wherein the adjacent spectra of each wave packet overlap at substantially one-half amplitude values,
    b. receiving and recording independently the waves returned from the earth due to each such wave packet, and
    c. combining recorded waves due to each wave packet, thereby forming a composite signal having the preselected frequency spectrum.

2. The method of claim 1 in which recorded waves due to each wave packet are weighted in amplitude to account for differences in energy content and to produce a flatter frequency spectrum.

3. The method of claim 1 in which the seismic wave packets are transmitted sequentially.

4. The method of claim 1 in which the seismic wave packets are transmitted simultaneously.

5. The method of claim 1 wherein each wave packet is amplitude modulated with a half cycle of a sinusoid.

6. The method of claim 1 wherein the product of the center frequency of at least some of the wave packets to their duration remains constant.

7. The method of claim 1 in which a number of replications of selected wave packets are transmitted, received, recorded and combined to obtain sufficient energy content.

8. A method of seismic prospecting in which the effective input seismic wave has a preselected frequency spectrum which comprises:
  a. generating a discrete wave packet of seismic waves of constant frequency near the surface of the earth and of sufficient magnitude to penetrate the earth and be reflected by subsurface strata at a depth of interest,
  b. recording a transmitted signal which is representative of the discrete wave packet transmitted into the earth,
  c. detecting the waves received from subsurface strata at a point remote from the transmission of the wave packet,
  d. repeating steps (a), (b) and (c) above for other discrete wave packets of constant frequency within the selected frequency spectrum, each of such wave packets being of different bandwidth, the center frequencies among each of such wave packets forming substantially a geometric progression, the product of such center frequencies and the duration of the associated wave packet remaining constant,
  e. reproducing the recorded transmitted signals and the recorded detected signals,
  f. determining the relative changes among the reproduced transmitted signals required to produce, when added, an effective input seismic wave having the selected frequency spectrum,
  g. applying to the reproduced detected signals the same relative phase changes determined among corresponding transmitted signals,
  h. adding such adjusted reproduced detected signals to produce a composite signal.

9. A method of seismic exploration with a preselected frequency spectrum comprising the steps of:
   transmitting successive bursts of seismic energy into the earth, each burst of seismic energy being of different bandwidth, but the sum of the frequency spectra of all the successive bursts of energy approximating the preselected energy spectrum, the center frequencies of most of such bursts of energy substantially approximating a geometric progression, the adjacent spectra of each wave packet overlapping at substantially half-amplitude values,
   detecting and recording the waves received from the earth due to the transmission of such bursts of energy,
   adding from a common reference point the recorded detecting waves of each burst of energy to thereby form in effect a composite seismic signal.

10. A method seismic exploration for obtaining a composite reflected signal having a selected frequency spectrum which comprises:
   transmitting a constant frequency seismic wave of finite length into the earth,
   detecting the energy returned to the earth's surface from subsurface formations in response to such transmitted seismic wave,
   recording a signal representative of the detected energy,
   transmitting additional constant frequency seismic waves of different bandwidth, such additional seismic waves having different frequencies within the selected frequency spectrum, most of such frequencies forming substantially a geometric progression,
   detecting energy returned to the earth's surface from subsurface strata in response to such additional seismic waves,
   recording signals representative of the energy received from the additional seismic waves, and
   adding the recorded signals.

11. A method of seismic exploration in which it is desired to have an effective seismic wave with a selected frequency spectrum comprising:
   transmitting into the earth successive bursts of seismic energy of different bandwidth, wherein the sum of the frequency spectra of all the successive bursts approximate the selected frequency spectrum, wherein a plurality of successive bursts of energy have primary frequencies that fall substantially in the pattern of a geometric progression, and wherein adjacent spectra of each burst of energy overlap at substantially half-amplitude values,
   detecting the waves retuned from the earth's subsurface from each such burst of energy,
   producing a signal corresponding with each transmitted burst of energy and adding such signals,
   adding the detected waves due to each burst of energy with the same relative phase as in the addition of the transmitted signals, and
   correlating the sum of the transmitted signals, with the sum of the received signals.

12. A method for obtaining a composite seismogram from a series of signals due to separate seismic disturbances having a composite frequency spectrum which comprises:
   transmitting successive signal frequency seismic waves of finite length into the earth, wherein each seismic wave has a different frequency and different bandwidth wherein the number and spacing of the waves are adequate to define the composite frequency spectrum, and wherein a plurality of successive seismic waves have center frequencies that form substantially a geometric progression,
   detecting the waves returned from the subsurface in response to each of such transmitted seismic waves,
   adding all of the transmitted seismic waves to obtain one sum,
   adding the detected received signals to obtain another sum, and
   correlating one sum by the other to obtain a correlation received having the selected frequency spectra.

* * * * *

UNITED STATES PATENT OFFICE
CERTIFICATE OF CORRECTION

Patent No. 4,004,267          Dated January 18, 1977

Inventor(s) William Harry Mayne

It is certified that error appears in the above-identified patent and that said Letters Patent are hereby corrected as shown below:

Column 11, line 43 delete "$F_1$" and insert therefor --$F_i$--.

Column 11, line 56 after "(1/2T)" insert --$\int$--.

Column 11, line 61 delete "$\tau$is" and insert therefor --$\tau$ is--.

Signed and Sealed this second Day of August 1977

[SEAL]

Attest:

RUTH C. MASON
*Attesting Officer*

C. MARSHALL DANN
*Commissioner of Patents and Trademarks*